United States Patent Office 3,167,526
Patented Jan. 26, 1965

3,167,526
POLYPROPYLENE STABILIZED WITH A NICKEL PHENOLATE OF BIS-(p-ALKYL PHENOL) MONO-SULFIDE AND AN ORGANIC PHOSPHITE
Albright M. Nicholson, Warrensville Heights, Ohio, assignor to Ferro Corporation, Cleveland, Ohio, a corporation of Ohio
No Drawing. Filed Nov. 25, 1959, Ser. No. 855,266
12 Claims. (Cl. 260—45.75)

This invention relates, as indicated, to crystalline polypropylene compositions which have been stabilized with respect to ultraviolet light by the inclusion therein of certain nickel phenolates, hereinafter more particularly described, and with respect to heat by the inclusion therein of certain organic phosphites.

The inertness of crystalline polypropylenes under a variety of conditions has resulted in increasingly widespread use in diverse fields of application. One of the factors which limits present usefulness in outdoor applications is the tendency of the polymer to deteriorate under the influence of ultraviolet light present in sunlight. This deterioration is detectable in a number of ways, chief of which is an increase in brittleness and a decrease in elongation under tensile stress. These changes in the original characteristics of polypropylene cause sheets or fibers of such materials when exposed to weather to break and tear readily. Utilization of these materials in sheet or fiber form, in covering greenhouses, draping open areas in building construction, etc. is consequently much reduced. It has been found that certain bis-(p-alkyl phenol) monosulphides, in which part or all of the phenolic hydrogen atoms have been replaced by nickel posses important light stabilization characteristics when used as additives in crystalline polypropylenes. In general, these nickel phenolates are used in amounts ranging from about 0.05 part to about 5 parts per 100 parts of crystalline polypropylene. Specifically, the light stabilizers found thus useful are the nickel phenolates and nickel phenol-phenolates of o,o'-bis-(p-alkyl phenol) monosulphides in which the alkyl group contains from 2 to 12 carbon atoms. A nickel phenol-phenolate which has been found particularly useful in this respect is the nickel phenol-phenolate of o,o'-bis(p-1,1,3,3-tetramethylbutylphenol) monosulphide.

A principal use of crystalline polypropylene is in the production of fibers of very fine denier. Commercial polypropylene without special ultraviolet stabilizers withstands the high extrusion temperatures necessary for such fiber formation without discoloration. When crystalline polypropylene is stabilized against the deleterious effects of ultraviolet light in the manner aforesaid it has been found, most unexpectedly, that it discolors and darkens rapidly at elevated temperatures in the range of 500° F. to as high as 800° F. encountered in fiber formation processes, for example. Although heat stability at temperatures of the foregoing magnitude is not necessary for many purposes to which such ultraviolet light stabilized crystalline polypropylene compositions are put, nevertheless when it is desired to extrude light stabilized polypropylene compositions containing these nickel phenolates to form fibers, and particularly in the extrusion of very fine denier fibers, crystalline polypropylenes so stabilized undergo a discoloration rendering them unsatisfactory for further use. Of course, ultraviolet light stabilized crystalline polypropylene may be submitted to such elevated temperatures for purposes other than fiber formation where heat stability is likewise important.

It is a principal object of the present invention, therefore, to provide for the heat stabilization of certain nickel phenolate light stabilizers dissolved or dispersed in a matrix principally comprising crystalline polypropylene. Other objects of this invention will appear as the description proceeds.

To the accomplishment of the foregoing and related ends, this invention, then, comprises the features hereinafter fully described and particularly pointed out in the appended claims, the following description setting forth in detail certain illustrative embodiments of the invention, these being indicative, however, of but a few of the ways in which the principle of the invention may be employed.

It has now been found that crystalline polypropylene compositions containing a nickel phenolate of bis-(p-alkyl phenol) monosulphide in which the alkyl group contains from 2 to 12 carbon atoms, in amounts ranging from 0.05 part to 5 parts per 100 parts of polypropylene, may be stabilized against decomposition at elevated temperatures of the order of 500° F. to as high as 800° F. by the inclusion therein of from about 0.05 part to about 5 parts per 100 parts of crystalline polypropylene of an organic phosphite.

The term "stabilized" and the various forms of the word used herein has reference to improvement in the ability of the treated material upon prolonged exposure to a destructive force to retain certain of its original characteristics. Thus, in the present case, there is an improvement in the ability of crystalline polypropylene compositions containing certain ultraviolet light stabilizers, upon exposure to the destructive forces of elevated temperatures to retain original color. In the absence of the stabilizers of the present invention, crystalline polypropylene compositions containing a nickel phenolate of bis-(p-alkyl phenol) monosulphide, upon exposure to elevated temperatures of the order of 500° F. to 800° F., such as occur in the extrusion of polypropylene compositions through fiber forming spinneret, and particularly those of fine denier, rapidly become darkened in color, turning from substantially colorless to gray or gray-yellow. In the absence of the nickel phenolates, this darkening at spinning temperatures does not occur, but the product fails under exposure to ultraviolet light.

The term "phenolate" as used herein is used in the generic sense, that is, as identifying a compound characterized by the presence therein of the M—O—Q group where M is the hydrogen equivalent of nickel and Q is an aromatic ring, a carbon atom of which is linked to the metal through the oxygen atom. The term "phenol-phenolate," not in common usage, will be understood as a phenolate compound containing more than one phenolic group, in which some, but not all of the phenolic hydrogen have been replaced by nickel. The term "full phenolate" as used herein refers to a phenolate compound derived from a phenolic compound containing more than one phenolic group in which all the phenolic hydrogens have been replaced by the hydrogen equivalent of nickel.

The class of polypropylenes to which the present invention is primarily directed and in which stabilization against the deleterious effects of ultraviolet light exposure and exposure to elevated temperatures is achieved, is characterized as follows:

The contemplated polymers have crystalline structure as determined by X-ray analysis, a number average molecular weight range from about 45,000 to 100,000 and higher; a melting point in the range of from about 140° C. to about 170° C. when measured by a birefringence method, reduced specific viscosities (RSV) of about 1 to about 9, and densities of about 0.87 to 0.93. By the term "reduced viscosity" is meant the $\eta_{sp/c}$ determined on a solution of 0.1 g. of the polymer in 100 g. of decalin at 135° C.

Crystalline polyproplenes having the foregoing characteristics may be prepared by any of the well known processes of polymerizing polypropylene to a crystalline or isotactic polymer, as for example by the processes described in Belgium Patents 530,617; 538,782; 543,259; 546,846, etc.

By one such method, crystalline polypropylenes having the foregoing characteristics are separated from a liquid phase bulk polymerization reaction mass. In general, polymerization is effected in the presence of certain metal-containing catalysts where the metal is of the Fourth or Sixth Group of the Periodic System. The reaction pressure ranges from atmospheric to as high as 30 atmospheres, and the temperature ranges between 20° C. and 150° C. Solvent or diluent may be present, or the liquid monomer may be the only material present in addition to the catalyst. The reaction is conducted in the absence of oxygen and water. Various fractions of the polymerized mass are separated by special sequential solvent treatment. For complete details reference may be had to the patent of Natta and Ziegler, Belgium Patent 538,782, for the preparation of crystalline polyproylene compositions in which stabilization against dgradation by ultraviolet light and stabilization against degradation by elevated temperatures is secured in accordance herewith. Other methods of producing crystalline polypropylenes may, of course, be employed. The polymers in the commercial form usually have other ingredients present in small amounts.

The organic phosphites which have been found useful in accordance with the present invention have the general formula:

wherein $R_1$ and $R_2$ are each selected from the group consisting of aryl, alkyl, cycloalkyl, alkaryl, aralkyl, alkoxy aryl, alkoxy alkyl, aroxy alkyl and alkoxy cycloalkyl radicals containing at least 5 carbon atoms and mono OH substituted variants of foregoing, R is selected from the group consisting of hydrogen and $R_1$ and $R_2$ radicals and having a boiling point at atmospheric pressure of at least 500° F. While this broad class of organic phosphites shows effectiveness for the purposes of the present invention, it has been found that those organic phosphites which are characterized by the presence of an aryl nucleus having a carbon atom thereof indirectly attached to the phosphorous atom through an oxygen atom are particularly effective, and especially the tri-(alkyl-aryl) phosphites. Reaction products of chemically equivalent amounts of phenol sulphides with $PCl_3$ may also be used.

Specific illustrative examples of the class of organic phosphites contemplated for use in accordance herewith are as follows:

Tri-iso-amyl phosphite
Tri-phenyl phosphite
Tri-cresyl phosphite
Tri-benzy phosphite
Tri-naphthyl phosphite
Tri-(p-ethylphenyl) phosphite
Tri (o-iso-propylphenyl) phosphite
Tri-(p-tert.-butylphenyl) phosphite
Tri-(p-tert.-amylphenyl) phosphite
Tri-(p-cyclohexylphenyl) phosphite
Tri-(p-2-ethylhexylphenyl) phosphite
Tri-(p-n-octylphenyl) phosphite
Tri-(p1,1,3,3,-tetramethylbutylphenyl) phosphite
Di-(phenyl), mono-isoocytl phosphite
Tri-(p-nonylphenyl) phosphite
Tri-(p-laurylphenyl) phosphite
Tri-(p-methoxyphenyl) phosphite
Tri-hexyl phosphite
Tri-cyclohexyl phosphite
Tri-methylcyclohexyl phosphite
Tri-2-ethylhexyl phosphite
Tri-capryl phosphite
Tri-decyl phosphite
Tri-dodecyl phosphite
Tri-(phenyl-ethyl) phosphite
Tri-(phenyl-hexyl) phosphite
Tri-(phenyl-n-octyl) phosphite
Tri-(p-methyl phenyl-hexyl) phosphite
Tri-(ethoxy-n-butyl) phosphite
Tri-(p-hydroxy phenyl iso-propylidene phenyl) phosphite
Mono-phenyl, di-dodecyl phosphite
Mono-phenyl, di-capryl phosphite
Di-phenyl-phosphite
Di-cresyl phosphite
Di-capryl phosphite
Di-cyclohexyl phosphite
Di-lauryl phosphite
Di-(tert.-butylphenyl) phosphite
Di-methoxyphenyl phosphite From the foregoing specific examples, those skilled in the art will obtain sufficient information to enable them to arrive at tri- or di-substituted organic phosphites other than those specifically mentioned which will be found useful in accordance with the present invention. In general, so long as the phosphite contains at least 5 carbon atoms in each organic substituent radical and there are at least 2 substituent radicals, compatibility and boiling point of the phosphite are sufficient for the purposes of the present invention. Substitutent groups other than those specifically illustrated in the foregoing listing of specific examples, may be present, although it is desired that no color be imparted by this particular additive since it is desired objective to maintain the color as nearly constant as possible in these crystalline polypropylene compositions. Hydroxy substituents in the alkyl, aryl, or cycloalkyl radicals may be tolerated so long as compatibility can be maintained. The presence of ether, thioether, or ester groups in the alkyl or aryl substituents likewise does not seem to interfere with the operability of these compounds as heat stabilizers for nickel phenolate-containing crystalline polypropylene compositions.

Typical crystalline polypropylene compositions stabilized to ultraviolet exposure and suitable for forming very fine denier fibers are as follows:

EXAMPLE 1

| | Parts |
|---|---|
| Commercial crystalline polypropylene (M.P. 333° F., sp. gr. 0.9, "Pro-fax") | 100 |
| Nickel phenol-phenolate of o,o'-bis-(p-1,1,3,3-tetramethylbutylphenol) monosulphide | 0.5 |
| Tris-(p-1,1,3,3-tetramethylbutylphenyl) phoshite | 0.5 |

EXAMPLE 2

| | Parts |
|---|---|
| Crystalline polypropylene (M.P. 330° F., sp. gr. 0.9) | 100 |
| Nickel phenol-phenolate of o,o'-bis-(p-1,1,3,3-tetramethylbutylphenol) monosulphide | 0.5 |
| Tris-(p-nonylphenyl) phosphite | 0.5 |

Examples 1 and 2 are easily produced by milling the several ingredients together on a 2-roll steam heated mill according to usual practice. Both products may be used in the production of fine denier fibers which are stable to ultraviolet light. Although the temperatures of fiber formation may range from 500° F. for several minutes to 750° F. for a few seconds, these compositions do not undergo undesirable color change in the process.

It has also been found that the organic phosphites of the present invention are effective in crystalline polypropylene compositions which have been formulated with nickel soaps and a bis-(p-alkyl phenol) monosulphide as separate ingredients. Under these circumstances, the nickel phenolates and nickel phenol-phenolates are formed in situ.

As indicated above, the organic phosphites are incorporated into the crystalline polypropylene either as solutions in a low boiling solvent, or milled in directly at 350° F.

on steam heated 2-roll mill at some appropriate temperature, such as, in the range of from 300° F. to 400° F. The incorporation of the organic phosphite may be simultaneous with the incorporation of the nickel phenolate or not, as desired. The crystalline polypropylene-nickel phenolate compositions are capable of being reworked at the normal milling temperatures, indicated above, without decomposition. It is preferable, however, that the organic phosphite be intimately admixed with the crystalline polypropylene at the same time as, or before the nickel phenolate ultraviolet light stabilizer is added.

Other materials such as pigment, additional ultraviolet light absorbers, extenders, e.g. CaO or $CaSiO_3$ processing aids, and other polymers may be included in these compositions in the amounts in which such materials are normally employed in polypropylene compositions.

The following Table I illustrates a number of additional specific examples of this invention together with various control examples for comparative purposes. Comparison is made on samples prepared in identical manner and as above described for Example 1 with the several ingredients in the indicated amounts by weight under each example number. The basis of comparison is the optical density of 10 mil films after exposure to 575° F. temperature for 15 minutes.

The current invention applies not only to the use of organic phosphites, such as described above in compositions to which nickel phenolates (or nickel phenol-phenolates) have been added as such, but also to compositions in which substances capable of reacting to form nickel phenolates (or nickel phenol-phenolates) have been added to the crystalline polypropylene matrix.

Other combinations of various nickel phenolates, both full phenolates and phenol-phenolates of o,o'-bis-(p-alkyl phenol) monosulphides with crystalline polypropylene are also heat sensitive at elevated temperatures and may be stabilized against heat induced degradation by the inclusion of from about 0.05 to about 5 parts per 100 parts of crystalline polypropylene of an organic di- or tri-substituted phosphite. The following are illustrative compositions:

EXAMPLE 13

| | Parts |
|---|---|
| Commercial crystalline polypropylene (M.P. 333° F., sp. gr. 0.9) | 100 |
| Nickel phenol-phenolate of o,o'-bis-(p-tert.-amylphenol) monosulphide | 0.1 |
| Diphenyl phosphite | 0.05 |

Table I

| Example No. | 3 | 4 | 5 | 6 | 7 | 8 | 9 | 10 | 11 | 12 |
|---|---|---|---|---|---|---|---|---|---|---|
| Crystalline Polypropylene ("Pro-fax") | 100 | 100 | 100 | 100 | 100 | 100 | 100 | 100 | 100 | 100 |
| Nickel Phenol-phenolate | | 0.5 | 0.5 | 0.5 | 0.5 | 0.5 | 0.5 | 0.5 | 0.5 | 0.5 |
| Tris nonylphenyl phosphite | | | 0.5 | | | | | | | |
| Tris-(p-1,1,3,3-tetramethylbutylphenyl) phosphite | | | | 0.25 | | | | | | |
| Triphenyl phosphite | | | | | 0.5 | | | | | |
| Diphenyl mono Isooctyl phosphite | | | | | | 0.5 | | | | |
| Diphenyl phosphite | | | | | | | 0.5 | | | |
| Dioctyl phosphite | | | | | | | | 0.5 | | |
| p-Octylphenol | | | | | | | | | 0.5 | |
| Calcium stearate | | | | | | | | | | 0.4 |
| Optical Density (10 mil film) | 0.08 | 0.43 | 0.11 | 0.11 | 0.04 | 0.06 | 0.03 | 0.03 | 0.50 | 0.72 |

In the foregoing Table I, nickel phenol-phenolate was the nickel phenol-phenolate of o,o'-bis-(p-1,1,3,3-tetramethylbutylphenol) monosulphide which may be produced in accordance with the following:

A solution of p-1,1,3,3-tetramethylbutylphenol (200 grams) in $CCl_4$ (640 grams) is prepared at room temperature and then cooled to 45° F. with strong agitation. At this temperature the p-1,1,3,3-tetramethylbutylphenol tends to come out of solution, but this is of little concern as long as the mixture is kept under agitation. 50 grams of $SCl_2$ admixed and in solution with 50 grams of $CCl_4$ are added over a period of about 1 hour, and the mixture allowed to agitate for an hour after the addition has ceased. After overnight standing, the mixture is washed with water to extract HCl, cooled and diluted with 200 grams of petroleum ether (B.P. 30°–60° C.). The more highly sulphurized product is soluble in the petroleum ether. However, the o,o'-bis-(p-1,1,3,3-tetramethylbutylphenol) monosulphide separates out as a crystalline white solid which is easily filtered.

To produce the nickel phenol-phenolate particularly useful in accordance with this invention, a quantity of nickel acetate tetrahydrate dissolved in xylene (1:1) and equivalent to half the number of phenolic OH groups in the sulphurized phenol is heated with a 40% solution of o.o'-bis-(p-1,1,3,3-tetramethylbutylphenol) monosulphide in xylene at or slightly below the boiling point of acetic acid. With continued heating the latter is distilled off almost quantitatively. The xylene solution is filtered to remove any xylene-insoluble impurities which may have formed during the reaction. The filtrate is evaporated to remove all the xylene. The residual liquid may be cooled by any of several procedures to yield the solid product. The product is hard and friable and contains 6.1% Ni (theoretical 6.1% Ni).

EXAMPLE 14

| | Parts |
|---|---|
| Commercial crystalline polypropylene (M.P. 333° F., sp. gr. 0.9) | 100 |
| Nickel phenol-phenolate of o,o'-bis-(p-laurylphenol) monosulphide | 5 |
| Dicyclohexyl phosphite | 5 |

EXAMPLE 15

| | Parts |
|---|---|
| Commercial crystalline polypropylene (M.P. 333° F., sp. gr. 0.9) | 100 |
| Nickel phenol-phenolate of o,o'-bis-(p-1,1,3,3-tetramethylbutylphenol) monosulphide | 1 |
| Triphenyl phosphite | 1 |

EXAMPLE 16

| | Parts |
|---|---|
| Commercial crystalline polypropylene (M.P. 333° F., sp. gr. 0.9) | 100 |
| Nickel phenolate of o,o'-bis-(p-1,1,3,3-tetramethylbutylphenol) monosulphide | 0.5 |
| Tris nonylphenyl phosphite | 0.5 |

The nickel phenolate in Example 16 is a full phenolate and may be prepared by treating crystalline o,o'-bis-(p-1,1,3,3-tetramethylbutylphenol) prepared as above described with $NaOC_2H_5$ to replace all the phenolic hydrogen, and then converting to the nickel phenolate with a stoichiometric amount of $NiCl_2$ dissolved in absolute alcohol, filtering off the precipitated CaCl and recovering the nickel phenolate from the solvent system by evaporating the solvents.

The following examples illustrate the presence of other substituent groups, e.g. thioether and hydroxyl, in the organic radicals of the phosphite.

EXAMPLE 17

| | Parts |
|---|---|
| Crystalline polypropylene ("Pro-fax") | 100 |
| Nickel phenol-phenolate of o,o'-bis-(p-1,1,3,3-tetramethylbutylphenol) monosulphide | 0.5 |
| Reaction product of o,o'-bis-(p-1,1,3,3-tetramethylbutylphenol) monosulphide with PCl₃ (3:1) | 0.5 |

Optical density of the foregoing composition was 0.06.

EXAMPLE 18

| | Parts |
|---|---|
| Crystalline polypropylene ("Pro-fax") | 100 |
| Nickel phenol-phenolate of o,o'-bis-(p-1,1,3,3-tetramethylbutylphenol) monosulphide | 0.5 |
| Reaction product of iso-propylidene diphenol (Bisphenol A) with PCl₃ (3:1) | 0.5 |

Optical density of the foregoing composition was 0.13.

In Examples 17 and 18 optical density was measured under same test conditions as set out in Table I above.

Crystalline polypropylene compositions stabilized against deleterious effects of ultraviolet light by the inclusion therein of minor amounts of certain nickel phenolates and nickel phenol-phenolates as above described, which have been further stabilized against deleterious effects of heat on such compositions, are particularly useful in the formation of very thin strands of polypropylene material by extrusion through dies in the normal manner in which fibers and threads of these polymers are ordinarily made. Extrusion temperatures are generally in the neighborhood of 500° F. to 800° F., and it is essential that the light stabilized crystalline polypropylene compositions be able to withstand temperatures of this magnitude for the period of time necessary to effect the extrusion. With the coarser thread, lower temperatures may be used, but it is common practice to maintain a bulk of the crystalline polypropylene in molten condition at or near extrusion temperatures of the magnitude of 500° F. or higher for a period of several minutes prior to extrusion. In the case of the formation of crystalline polypropylene fibers of very fine denier, extrusion takes place very rapidly at much higher temperatures. Such higher temperatures are necessary in order to reduce the viscosity sufficiently that the material may be extruded through the very fine apertures in the spinneret. Consequently, it is not uncommon that crystalline polypropylene compositions stabilized to ultraviolet light by nickel compounds as above described, should be subjected to temperatures of the magnitude of 700°–800° F. and higher for periods of the order of a few seconds.

Under all of these conditions, the compositions of the present invention seem to be quite effective in presence of high temperatures and under exposure to ultraviolet light. In the absence of nickel compounds, difficulty with heat stability is not encountered, but resultant fibers are not stable to exposure to ultraviolet light. The introduction of the ultraviolet light stabilizers introduces into the overall composition an instability to heat. This is obviated in some manner by the inclusion of the phosphites which appear to be highly specific to the nickel compounds.

Other modes of applying the principle of the invention may be employed, change being made as regards the details described herein provided the features stated in any of the following claims or the equivalent of such be employed.

It is, therefore, particularly pointed out and distinctly claimed as the invention:

1. A crystalline polypropylene composition comprising about 100 parts by weight of polypropylene, about 0.05 to about 5 parts by weight of a nickel phenolate of a bis-(p-alkyl phenol) monosulphide in which the alkyl group contains about 2 to 12 carbon atoms, and about 0.05 to 5 parts by weight of an organic phosphite having a boiling point at atmospheric pressure of at least about 500° F. and having the general formula:

where $R_1$ and $R_2$ are organic radicals having about 5 to 18 carbon atoms and are each selected from the group consisting of aryl, alkyl, cycloalkyl having about six to seven carbon atoms, alkaryl, alkoxy aryl having about 7 carbon atoms, alkoxy alkyl having about 6 carbon atoms, cycloalkaryl having about 12 carbon atoms, aralkyl, bis-(alkyl phenol) monosulfide in which the alkyl group has about 8 carbon atoms, and alkylidene bis-(phenol) in which the alkylidene group has about 3 carbon atoms and R is selected from hydrogen, $R_1$ radicals and $R_2$ radicals.

2. A crystalline polypropylene composition comprising about 100 parts by weight of polypropylene, about 0.05 to about 5 parts by weight of a nickel phenolate of a bis-(p-alkyl phenol) monosulphide in which the alkyl group contains about 2 to 12 carbon atoms, and about 0.05 to 5 parts by weight of an organic phosphite having a boiling point at atmospheric pressure of at least about 500° F. and having the general formula:

where $R_1$ and $R_2$ are organic radicals having about 5 to 18 carbon atoms and are each selected from the group consisting of aryl, alkyl, cycloalkyl having about six to seven carbon atoms, alkaryl, alkoxy aryl having about 7 carbon atoms, alkoxy alkyl having about 6 carbon atoms, cycloalkaryl having about 12 carbon atoms, aralkyl, bis-(alkyl phenol) monosulfide in which the alkyl group has about 8 carbon atoms, and alkylidene bis-(phenol) in which the alkylidene group has about 3 carbon atoms and R is selected from hydrogen, $R_1$ radicals and $R_2$ radicals, at least one of said $R_1$ and $R_2$ radicals containing an aryl nucleus having a carbon atom thereof indirectly attached to the phosphorus atom through an oxygen atom.

3. A crystalline polypropylene composition comprising about 100 parts by weight of polypropylene, about 0.05 to about 5 parts by weight of a nickel phenolate of a bis-(p-alkyl phenol) monosulphide in which the alkyl group contains about 2 to 12 carbon atoms, and about 0.05 to 5 parts by weight of a tri-aryl phosphite in which said aryl group has about 5 to 18 carbon atoms.

4. A crystalline polypropylene composition comprising about 100 parts by weight of polypropylene, about 0.05 to about 5 parts by weight of a nickel phenolate of a bis-(p-alkyl phenol) monosulphide in which the alkyl group contains about 2 to 12 carbon atoms, and about 0.05 to 5 parts by weight of a tri-alkyl aryl phosphite in which the alkyl aryl group has about 5 to 18 carbon atoms.

5. A crystalline polypropylene composition comprising about 100 parts by weight of polypropylene, about 0.05 to about 5 parts by weight of a nickel phenolate of a bis-(p-alkyl phenol) monosulphide in which the alkyl group contains about 2 to 12 carbon atoms, and about 0.05 to 5 parts by weight of tri-(p-nonyl phenyl) phosphite.

6. A crystalline polypropylene composition comprising about 100 parts by weight of polypropylene, about 0.05 to about 5 parts by weight of a nickel phenolate of a bis-(p-alkyl phenol) monosulphide in which the alkyl group contains about 2 to 12 carbon atoms, and about 0.05 to 5 parts by weight of tri-(p-1,1,3,3-tetramethylbutylphenol) phosphite.

7. A method of stabilizing crystalline polypropylene containing a light stabilizing amount of a nickel phenolate of a bis-(p-alkyl phenol) monosulfide in which the alkyl radical has about 2 to 12 carbon atoms, said method comprising adding and mixing about 100 parts by weight of polypropylene and about 0.05 to about 5 parts by weight of an organic phosphite having a boiling point at atmospheric pressure of at least 500° F. and having the general formula:

where $R_1$ and $R_2$ are organic radicals having about 5 to 18 carbon atoms and are each selected from the group consisting of aryl, alkyl, cycloalkyl having about six to seven carbon atoms, alkaryl, alkoxy aryl having about 7 carbon atoms, alkoxy alkyl having about 6 carbon atoms, cycloalkaryl having about 12 carbon atoms, aralkyl, bis-(alkyl phenol) monosulfide in which the alkyl group has about 8 carbon atoms, and alkylidene bis-(phenol) in which the alkylidene group has about 3 carbon atoms and R is selected from hydrogen, $R_1$ radicals and $R_2$ radicals.

8. A composition comprising in intimate admixture about 100 parts by weight of polypropylene, about 0.05 to 5 parts by weight of a nickel phenolate of a bis-(p-alkyl phenol) monosulphide in which the alkyl group has about 2 to 12 carbon atoms, and about 0.05 to 5 parts by weight of a reaction product of one mole of $PCl_3$ and about three moles of a bis-(alkyl phenol) monosulphide in which the alkyl group has about eight carbon atoms.

9. A composition comprising in intimate admixture about 100 parts by weight of polypropylene, about 0.05 to 5 parts by weight of a nickel phenolate of a bis-(p-alkyl phenol) monosulphide in which the alkyl group has about 2 to 12 carbon atoms, and about 0.05 to 5 parts by weight of a reaction product of one mole of $PCl_3$ and about three moles of o,o′ - bis - (p - 1,1,3,3 - tetramethylbutylphenol) monosulphide.

10. A composition comprising in intimate admixture about 100 parts by weight of polypropylene, about 0.05 to 5 parts by weight of a nickel phenolate of a bis-(p-alkyl phenol) monosulphide in which the alkyl group has about 2 to 12 carbon atoms, and about 0.05 to 5 parts by weight of a reaction product of one mole of $PCl_3$ and about three moles of a bis-(hydroxyl phenyl) alkane in which the alkane group has about 3 carbon atoms.

11. A composition comprising in intimate admixture about 100 parts by weight of polypropylene, about 0.05 to 5 parts by weight of a nickel phenolate of a bis-(p-alkyl phenol) monosulphide in which the alkyl group has about 2 to 12 carbon atoms, and about 0.05 to 5 parts by weight of a reaction product of one mole of $PCl_3$ and about three moles of iso-propylidene bis-(phenol).

12. A method of stabilizing a crystalline polypropylene composition comprising mixing about 100 parts by weight of polypropylene, about 0.05 to 5 parts by weight of a nickel phenolate of a bis-(p-alkyl phenol) monosulphide in which the alkyl group contains about 2 to 12 carbon atoms and about 0.05 to 5 parts by weight of a tri-alkyl phenyl phosphite having about 5 to 18 carbon atoms.

References Cited by the Examiner
UNITED STATES PATENTS

| | | | |
|---|---|---|---|
| 2,340,938 | 2/44 | Daly | 260—45.75 |
| 2,716,092 | 8/55 | Leistner et al. | 260—45.95 |
| 2,834,768 | 5/58 | Friedlander | 260—45.7 |

LEON J. BERCOVITZ, *Primary Examiner.*

A. M. BOETTCHER, A. D. SULLIVAN, MILTON STERMAN, *Examiners.*